United States Patent Office 3,201,986
Patented Aug. 24, 1965

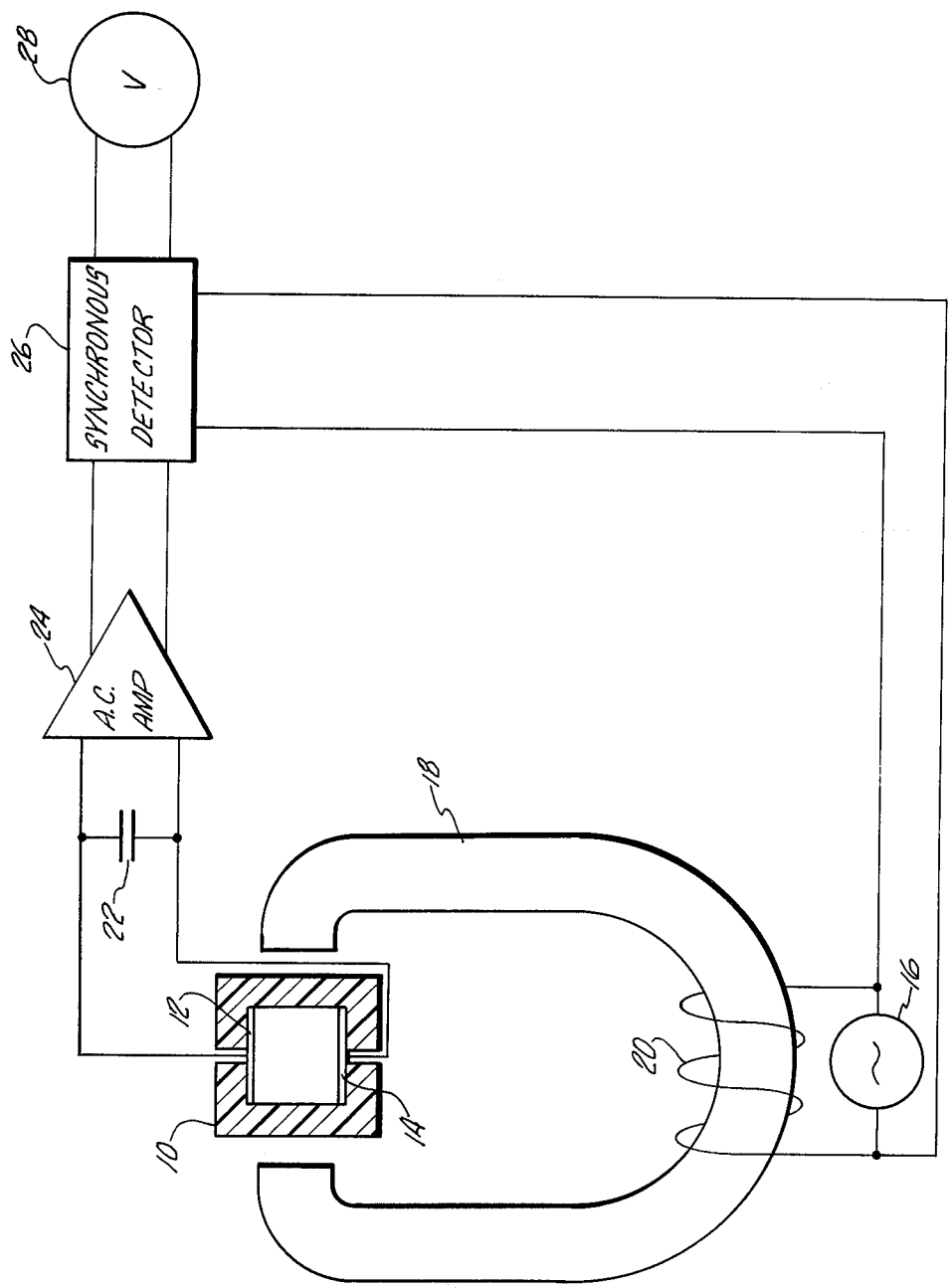

3,201,986
MASS FLOWMETER
Charles F. Robinson, Pasadena, Calif., assignor to Consolidated Electrodynamics Corporation, Pasadena, Calif., a corporation of California
Filed June 29, 1961, Ser. No. 120,687
5 Claims. (Cl. 73—194)

This invention relates to an induction type flowmeter for measuring the mass flow rate of nonconducting media such as petroleum products.

In the past induction type flowmeters have been provided for measuring the flow rate of conducting media. In general, these meters have included a pipe for transporting the conducting medium and means for generating an alternating magnetic field across the diameter of the pipe. The conducting medium in passing through the magnetic field generates an E.M.F. which is perpendicular to both the direction of flow and the magnetic field. In particular, the magnitude of the induced E.M.F. is directly proportional to a product of the magnetic field flux density B and the velocity of the conducting medium $v$. To measure the induced E.M.F. and hence to provide an indication of the flow rate through the pipe, a pair of point contact type electrodes are set into the wall of the pipe perpendicular to the magnetic field. These electrodes are insulated from the pipe to prevent a short circuiting of the induced voltage. Since the voltage developed between the electrodes is proportional to the flow rate of the medium through the pipe, a detection of the magnitude of the voltage induced between the electrodes represents a measure of the flow rate of the conducting medium through the pipe.

Although the above-described type of induction flowmeter has been extensively used to measure the flow rate of conducting media, its use has been limited thereto. In particular, it has been the teachings of the prior art, prior to this invention, that an induction-type flowmeter is only capable of measuring the flow rate of a medium if that medium were a conductor. In particular, it is commonly believed that induction-type flowmeters are limited to measuring the flow rate of a medium having a conductivity of greater than $10^{-7}$ mhos per meter.

Contrary to the teachings of the prior art, the present invention provides an induction type flowmeter for directly measuring mass flow rate of a nonconducting medium. To accomplish this, the present invention provides apparatus for measuring the induced voltage set up within a nonconducting medium due to the polarization thereof in passing through a magnetic field. In particular, in a basic form, the present invention includes a pair of parallel conducting plates disposed within the nonconducting medium parallel to the direction of flow of the medium and an alternating magnetic field which is set up across the medium. Further, the present invention includes a capacitor shunting the parallel plates having a capacitance which is substantially larger than the capacitance of the parallel plates and a voltage detection device coupled across the shunting capacitor. The voltage which is developed across the pair of parallel plates when shunted by the large capacitor is directly proportional to the mass flow rate of the nonconducting medium passing therebetween. Accordingly, the voltage detected by the voltage detection device provides a direct indication of the mass flow rate of a nonconducting medium.

The above as well as other features of the present invention may be more clearly understood by reference to the following detailed description when considered with the drawing, the single figure of which is a schematic representation of a basic form of the present invention.

As noted above, it is commonly known that when a conductor moves with a given velocity through a magnetic field, a voltage is induced within the conductor which is proportional to the flux density of the magnetic field and the velocity with which the conductor is moving. It is this principle which is applied in the prior art induction-type flowmeters for measuring the flow rate of conducting media. For various reasons, however, it has been taught in the prior art that similar principles of voltage induction could not be applied to measure the mass flow rate of nonconducting media. The present invention, however, contrary to these teachings, provides a flowmeter utilizing induction techniques for measuring the mass flow of a nonconducting medium. In particular, the present invention in providing an induction-type flowmeter for measuring the mass flow rate of a nonconductive medium utilizes the previously discovered fact that as a dielectric (nonconducting material) moves in a magnetic field, the induced electric field acting on the elastically bound electrons of the dielectric displaces them relative to the nuclei and causes a resultant polarization (see pages 445–446 of Theoretical Physics, 1932 edition by Joos as translated by Ira M. Freeman, PhD. and published by Stechert & Co. of New York. More particularly, as pointed out in the cited reference, the polarization charge $\sigma$ per unit area appearing at the opposite selected boundaries of the nonconducting medium moving through a magnetic field is given by the expression:

$$\sigma = \frac{(K-1)vB}{4\pi} \tag{1}$$

where K is the dielectric constant of the nonconducting material, $v$ is the velocity of the medium and B is the flux density of the magnetic field. By making the opposite boundaries of the nonconducting medium parallel condenser plates of a given area, a condenser is produced having a capacitance given by the expression:

$$C = \frac{KA}{4\pi d} \tag{2}$$

where A is the area of the plates and $d$ is the distance therebetween. Accordingly, the polarization charge appearing at the selected boundaries of the nonconducting material gives rise to a potential difference:

$$V = \frac{\sigma A}{C} \tag{3}$$

Substituting Equations 1 and 2 in Equation 3 gives:

$$V = \left(\frac{K-1}{K}\right)vBd \tag{4}$$

In providing the above described condenser configuration, it is recognized that a certain amount of stray capacitance is present. Accordingly, the total capacitance $C_t$ of the configuration may be represented:

$$C_t = \frac{KA}{4\pi d} + C_s \tag{5}$$

where $C_s$ represents the stray capacitance. This expression may be reduced to:

$$C_t = \frac{A}{4\pi d}(K+\gamma)$$

where $$\gamma = \frac{KC_s}{C} \tag{6}$$

From the above the expression (4), the voltage appearing between the condenser plates due to the polarization of the nonconducting material then becomes:

$$V = \frac{(K-1)vBd}{(K+\gamma)} \tag{7}$$

which reduces to:

$$V=\frac{(K-1)vBd}{(\gamma+1)}\left[1-\frac{K-1}{\gamma+1}+\frac{1}{2}\left(\frac{K-1}{\gamma+1}\right)^2 \cdots\right] \quad (8)$$

As is commonly known the density of a nonconducting material and the dielectric constant K are related by the expression:

$$(K-1)=\mu\rho \quad (9)$$

where $\mu$ is a constant for a given material and $\rho$ represents the density of the material. Further, the mass flow rate of a nonconducting material is defined by the expression:

$$\phi=\rho v \quad (10)$$

Thus, substituting this expression for the mass flow rate into that for the induced voltage, the expression for the induced voltage becomes:

$$V=\frac{\mu\phi Bd}{(\gamma+1)}\left[1-\frac{\mu\phi}{d(\gamma+1)}+\frac{1}{2}\left(\frac{\mu\phi}{d(\gamma+1)}\right)^2 \cdots\right] \quad (11)$$

From expression (11) it appears that the voltage developed between the condenser plates is directly proportional to the mass flow rate $\phi$ when $\gamma$ is large. In accordance with the present invention this is accomplished by shunting the condenser plates with a large capacitor, the ratio of the total capacitance to the capacitance between the plates then being large.

Although with $\gamma$ large, the magnitude of the voltage induced between the condenser plates is reduced, it has been found in practice that voltages on the order of a few hundred microvolts still result which signals are directly related to the mass flow rate of the nonconducting medium.

The above analysis may be applied to the induction flowmeter for measuring the mass flow rate of a nonconducting medium, as represented in the drawing. As shown, the induction-type flowmeter of the present invention includes a pipe 10 insulated with nonconducting material. As represented, by way of example, the pipe 10 is rectangular, having two of its opposite inner faces composed of a conducting material to form first and second parallel conducting plates 12 and 14, respectively.

Further, by way of example only, to generate an alternating magnetic field through the pipe 10, the present invention includes a source of alternating current signals represented at 16, a horse shoe magnet 18, and a coil 20. Accordingly, as represented, current flowing from the source 16 sets up a magnetic field which passes through the pipe 10 parallel to the conducting plates 12 and 14.

In the configuration represented in the drawing, a nonconducting medium flowing through the pipe 10 produces a polarization charge at the plates 12 and 14. To detect a voltage between the condenser plates 12 and 14 which is proportional to the mass flow rate of the nonconducting material, a capacitor 22 is coupled across the plates 12 and 14. In particular, in accordance with the above analysis, the magnitude of the capacitance of the capacitor 22 is large relative to the capacitance of the plates 12 and 14. Accordingly, the voltage developed between the condenser plates 12 and 14 when the capacitor 22 is included is substantially proportional to the mass flow rate of the nonconducting material flowing in the pipe 10. As indicated above, this voltage is generally in the neighborhood of a few hundred microvolts. Accordingly, to detect this voltage with the ordinary alternating current voltmeter, it is necessary first to amplify the voltage signal. To accomplish this an alternating current amplifier 24 is connected across the capacitor 22.

As illustrated in the drawing, the output of the alternating current amplifier 24 is coupled to a synchronous detector 26, the output of which is coupled to a voltmeter 28. The synchronous detector 26 also receives the alternating current signal from the source 16 and operates to provide at its output a voltage signal which is in phase with the alternating magnetic field, this voltage signal being that due to the polarization charge carried at the condenser plates 12 and 14. Accordingly, the synchronous detector 26 rejects all other induced voltages which may be present in the system. In particular, the synchronous detector 26 rejects an undesired induced voltage which is present in all induction-type flowmeters. This undesired induced voltage is generally caused by transformer effects of the alternating magnetic field on the leads connecting the condenser plates 12 and 14 to the input of the alternating current amplifier. This undesired induced voltage signal is ninety degrees (90°) out of phase with the voltage signal due to the polarization charge appearing at the condenser plates 12 and 14. Accordingly, by synchronizing the detector 26 with the output of the source 16, the undesired induced voltage signal is rejected, only the desired induced voltage signal due to the polarization of the nonconducting material being measured by the voltmeter 28.

In view of the above, it appears that by use of parallel plate conducting electrodes shunted by a large external capacitance, an induction flowmeter is provided for accurately measuring the mass flow rate of nonconducting media heretofore not contemplated by the prior art.

What is claimed is:

1. Apparatus for detecting the mass flow rate of a medium having a conductivity of less than approximately $10^{-7}$ mhos per meter comprising: a pipe having a lining of nonconducting material for transporting the medium; first and second parallel plates of conducting material disposed within said pipe parallel to the direction of flow of the medium; a capacitor coupled externally to said pipe across said first and second parallel plates, said capacitor having a capacitance which is substantially greater than the capacitance of said first and second parallel plates; means for generating an alternating magnetic field through said pipe having a component of flux parallel to the opposing surfaces of said first and second parallel plates and perpendicular to the direction of flow of said medium; and phase synchronous voltage detection means coupled across said capacitor and to the means for generating the alternating magnetic field for detecting the voltage induced between said first and second parallel plates due to the flow of said medium through said magnetic field.

2. Apparatus for detecting the rate of mass flow of a nonconducting medium comprising: means for generating an alternating magnetic field through the medium perpendicular to the direction of flow of the medium; first and second plates of nonconducting material mounted parallel to each other, the magnetic field, and the direction of flow of the medium; means for directing the flow of the medium between the plates; a capacitor shunting said first and second plates, said capacitor having a capacitance which is large relative to the capacitance of said first and second plates; and voltage detection means coupled across said capacitor.

3. Apparatus for detecting the mass flow rate of a dielectric medium comprising: a pipe having a lining of nonconducting material for transporting the dielectric medium; first and second parallel conductive plates disposed within said pipe parallel to the direction of flow of the medium; means for generating a magnetic field extending transversely to said pipe and parallel to said first and second plates; a capacitor shunting said first and second plates, said capacitor being large relative to the capacitance of said first and second parallel plates; and means coupled across said capacitor for detecting the voltage induced between said first and second plates due to the flow of said dielectric medium through said magnetic field.

4. Apparatus for detecting the mass flow rate of a dielectric medium comprising: a rectangular pipe having two opposite inner faces composed of a conducting material for transporting the dielectric medium; means for generating an alternating magnetic field through said pipe transverse to said medium and parallel to said sides of conducting material; and means for detecting the voltage difference between the opposite sides of said pipe including a capacitor coupled between said opposite sides of said pipe and an alternating current voltage detection device shunting said capacitor, said capacitor having a capacitance greater than the capacitance of said opposite inner faces of said pipe.

5. In a flowmeter for detecting the mass flow rate of a fluid dielectric medium moving along a defined path and which includes first and second parallel plates of conducting material disposed within and parallel to the direction of flow of the medium and means for generating an alternating magnetic field transverse to the direction of flow of the medium and parallel to said first and second plates, the combination of: a capacitor shunting said first and second plates, said capacitor having a capacitance which is substantially larger than the capacitance of said first and second plates and means shunting said capacitor for detecting the voltage induced between said first and second plates which is in phase with the alternating magnetic field.

References Cited by the Examiner

UNITED STATES PATENTS 2,733,604  2/56  Coulter _____ 73—194

RICHARD C. QUEISSER, *Primary Examiner*.